United States Patent [19]
Kirk, Jr. et al.

[11] 3,975,585
[45] Aug. 17, 1976

[54] ELECTRONIC COMMUNICATIONS SYSTEM FOR SUPPLEMENTARY VIDEO PROGRAM DISTRIBUTION

[75] Inventors: Donald Kirk, Jr.; Michael J. Paolini, both of St. Petersburg, Fla.

[73] Assignee: Columbia Pictures Industries, Inc., New York, N.Y.

[22] Filed: Sept. 20, 1973

[21] Appl. No.: 399,129

Related U.S. Application Data

[63] Continuation-in-part of Ser. No. 328,377, Jan. 31, 1973, Pat. No. 3,916,091.

[52] U.S. Cl. .......................... 178/5.1; 178/DIG. 13; 325/308; 325/461
[51] Int. Cl.² ........................................... H04N 1/44
[58] Field of Search .................... 178/DIG. 13, 5.1; 325/308, 461, 438, 453

[56] References Cited
UNITED STATES PATENTS

| | | | |
|---|---|---|---|
| 3,231,818 | 1/1966 | Court | 178/5.1 |
| 3,360,730 | 12/1967 | Sims | 325/461 |
| 3,668,307 | 6/1972 | Face et al. | 325/308 |
| 3,733,430 | 5/1973 | Thompson et al. | 178/DIG. 13 |
| 3,777,053 | 12/1973 | Wittig et al. | 178/5.1 |
| 3,789,131 | 1/1974 | Harney | 178/5.1 |
| 3,790,700 | 2/1974 | Callais et al. | 178/5.1 |

*Primary Examiner*—Maynard R. Wilbur
*Assistant Examiner*—S. C. Buczinski
*Attorney, Agent, or Firm*—Kenyon & Kenyon Reilly Carr & Chapin

[57] ABSTRACT

A one-way cable communications system — as for a lodging facility, distributes commercial and supplementary video programming from common equipment to spaced subscriber stations located, for example, in each hotel-motel room. Heterodyne converter apparatus is included at each station for viewing the supplementary programming on a standard television receiver.

The system includes common address and command transmitting, and room terminal receiving equipment to control the video reception mode for the several room terminals.

5 Claims, 11 Drawing Figures

FIG. IA

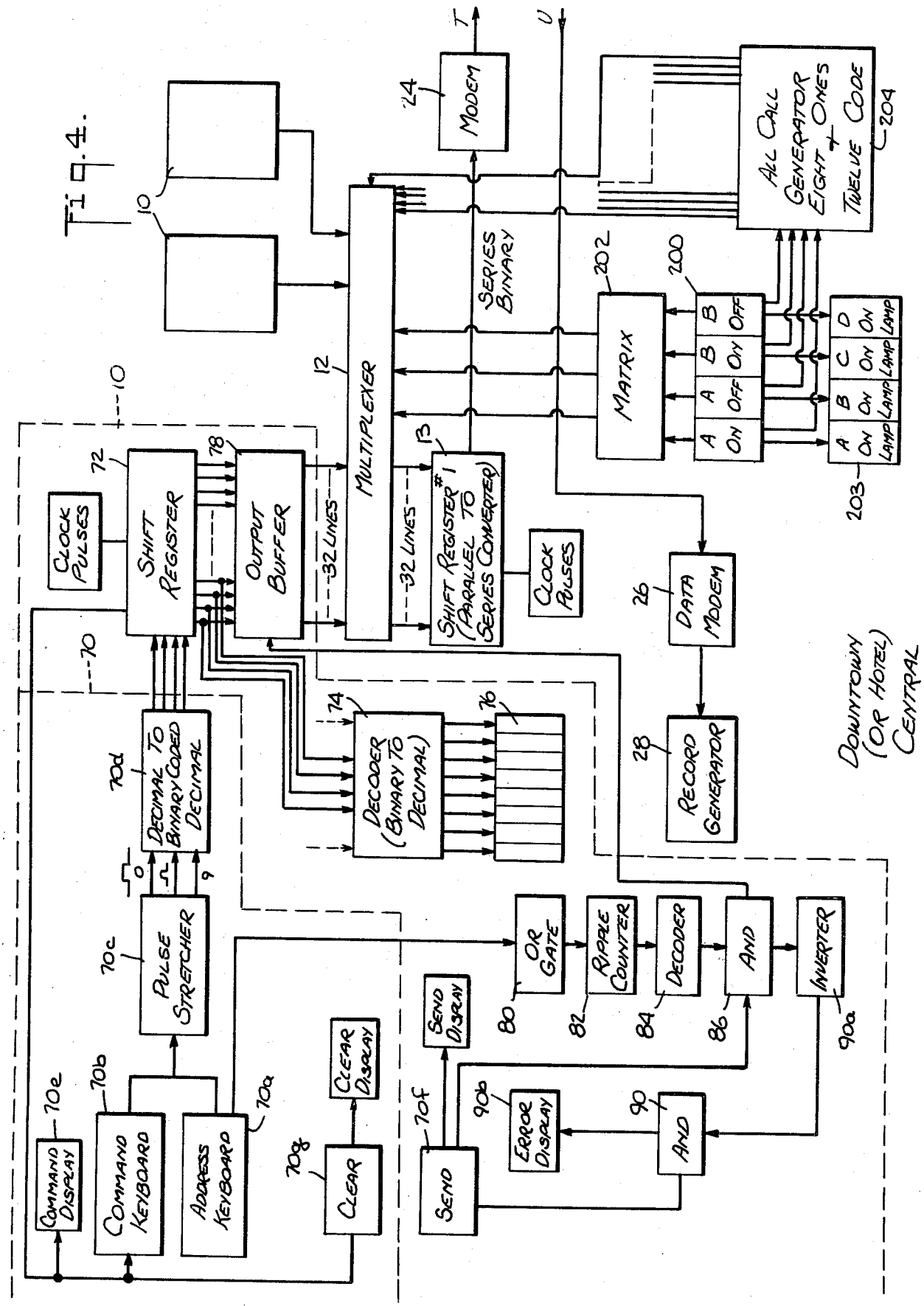

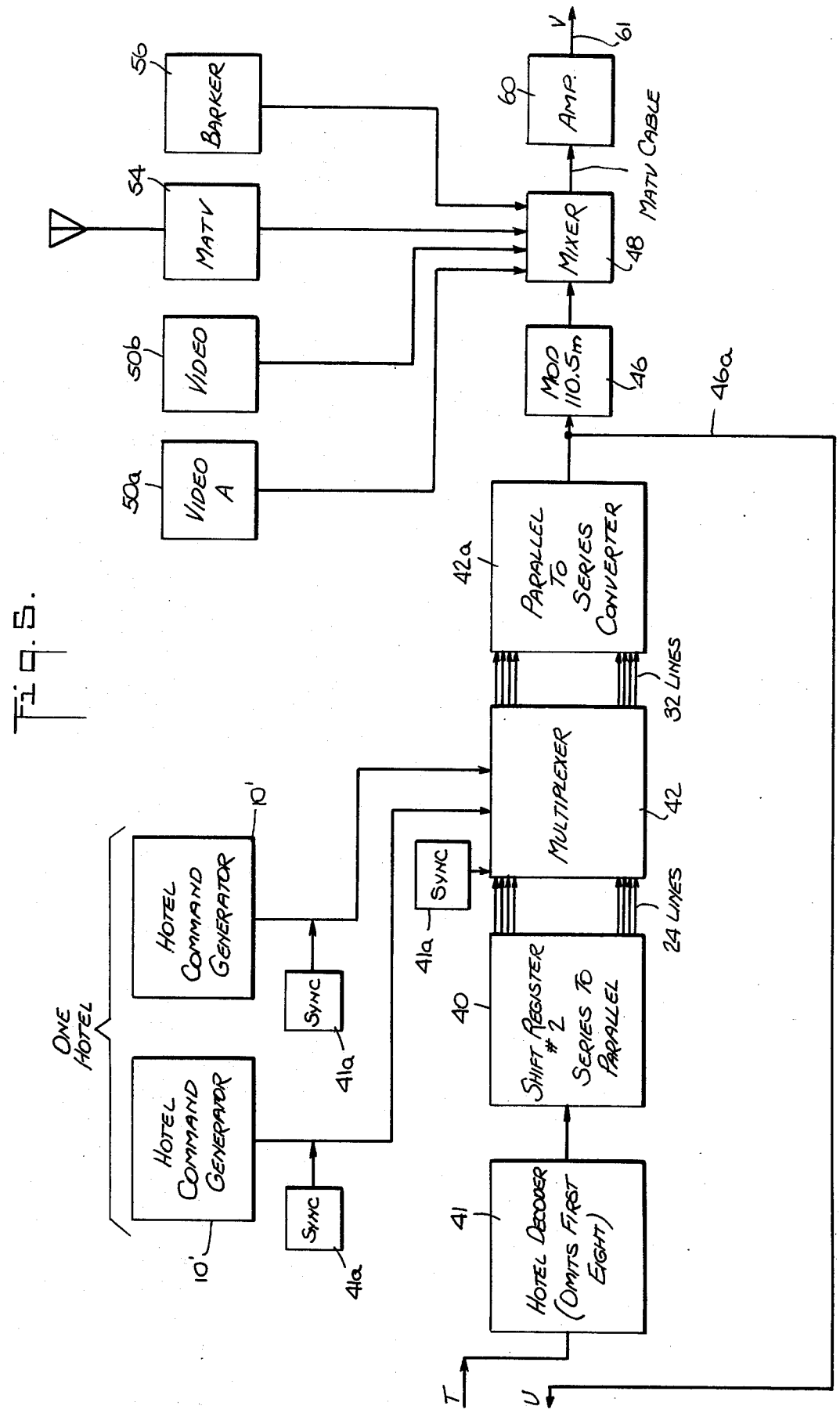

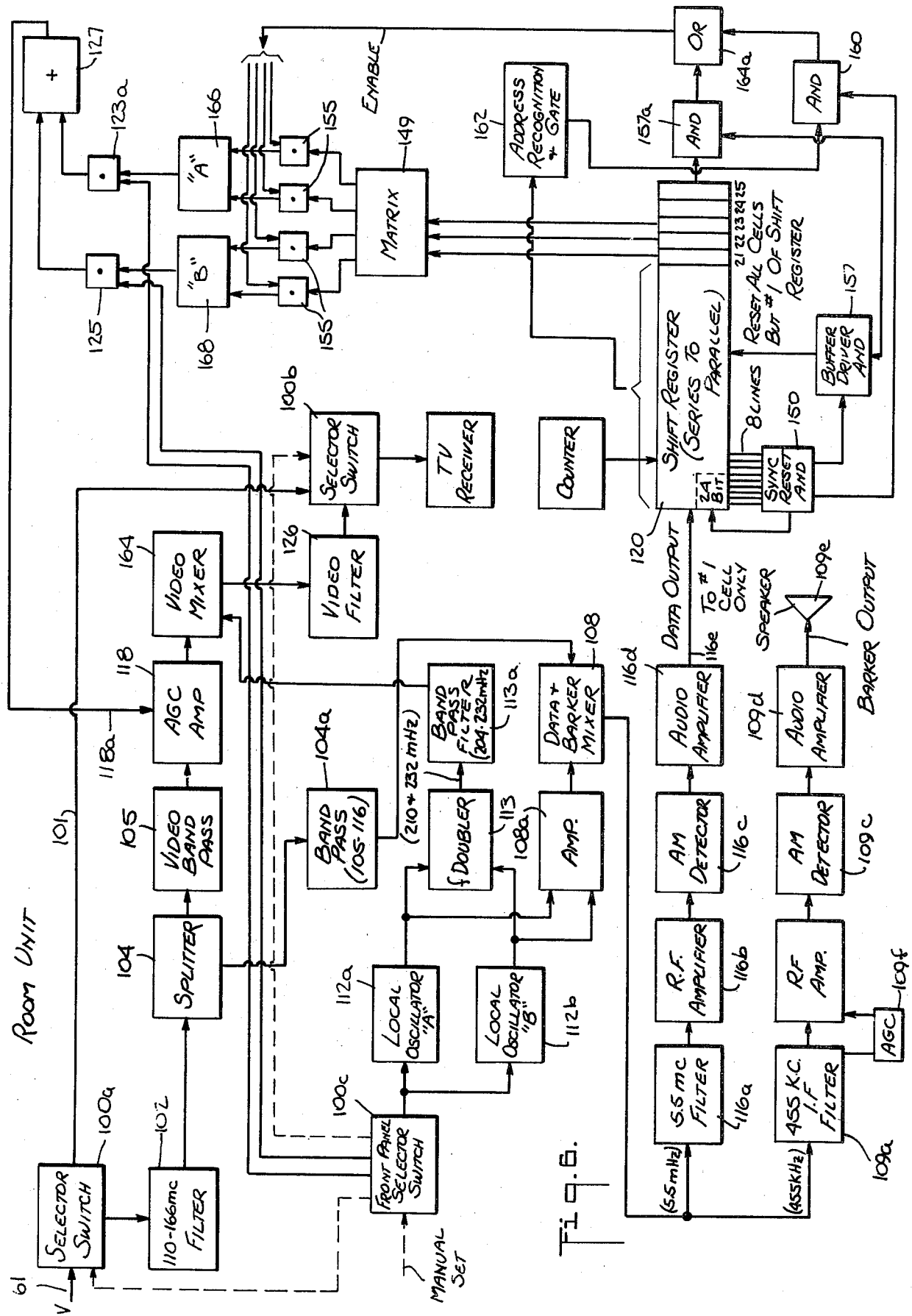

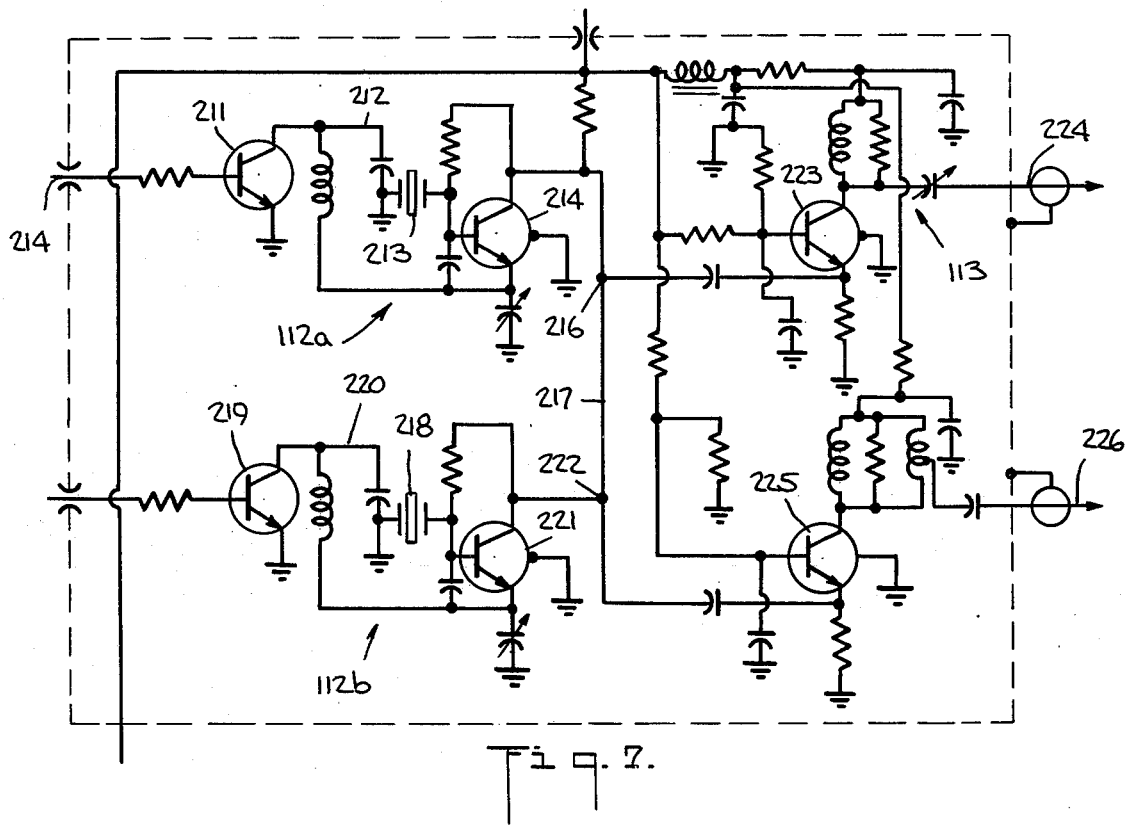

ELECTRONIC COMMUNICATIONS SYSTEM FOR SUPPLEMENTARY VIDEO PROGRAM DISTRIBUTION

CROSS-REFERENCE TO RELATED APPLICATION

This application is a continuation-in-part of our co-pending U.S. patent application Ser. No. 328,377, filed on Jan. 31, 1973, now U.S. Pat. No. 3,916,091.

DESCRIPTION OF THE PRIOR ART

U.S. Pat. No. 3,078,337, issued Feb. 19, 1963, to William J. Shanahan et al and entitled "Metering Systems" discloses a two-way television subscription system. In the Shanahan system the head end on a cyclic basis interrogates the equipment of each of the subscribers. If a given subscriber has made a selection of a private channel, a reply signal is transmitted to the head end upon each interrogation of the subscriber's equipment. There is disclosed the use of a coded interrogation signal which is capable of enabling any subscriber to transmit his reply signal. The term "two-way system" is applicable since the head end transmits an interrogation signal to the subscriber and the subscriber transmits a reply signal to the head end.

U.S. Pat. No. 3,387,082 issued June 4, 1968, to Richard J. Farber for "Pay Television Audience Survey and Billing System" discloses another two-way subscription television system. Here the head end transmits interrogation signals in the form of modulated carriers of different predetermined frequencies. If a given subscriber sysem is selected to receive a private channel, a predetermined tone signal identifying a particular private channel to be received is transmitted to the head end. As in the Shanahan system a reply signal is transmitted to the head end only if a selection has been made by the subscriber and only after an interrogation signal from the head end.

U.S. Pat. No. 3,668,307 issued June 6, 1972, to William W. Face et al for "Two-Way Community Antenna Television System" discloses still another form of a two-way system. In accordance with the system, code groups each consisting of three subgroups are transmitted to the subscribers. The code subgroups include a locator bit which identifies the beginning of a code group. Thereafter there is transmitted a second code subgroup corresponding to the predetermined address of a single subscriber. The final code subgroup contains the instruction to be transmitted to the addressed subscriber. The subscriber equipment decodes the transmitted code group by a comparison process. The decoded instructions at the addressed subscriber enables the subscriber equipment, for example, to receive a private television channel. If a subscriber has elected to receive a private channel the subscriber must make evidence of such a selection by means of a request register at the subscriber equipment. Upon the coded signal from the head end enabling the subscriber equipment of the addressed subscriber, the request register sends a reply signal to the head end to indicate that the addressed subscriber is utilizing the private channel which has been enabled. As in Shanahan and Farber, the Face system employs a reply signal which can be used by the head end to record use of the private channels. Unlike Shanahan and Farber, in the Face system the subscriber equipment is enabled to utilize a private channel only after the reception by a subscriber of the code addressed to that subscriber.

Two-way cable television systems are reviewed in the article entitled "Two-Way Applications for Cable Television Systems in the '70s" which was published in the IEEE Spectrum, November 1971, pages 39–54.

DISCLOSURE OF INVENTION

This invention relates to electronic signal distribution systems and, more specifically, to a one-way signal translating system for distributing commercial and supplementary video programing from a central station to plural spaced subscriber locations.

In selected present day private communications systems, it has been found desirable to provide some electronic intelligence which may be received only by system subscribers who pay for this service. Thus, we have found that lodging service may be enhanced for all concerned where the hotel-motel proprietor makes supplementary programing — e.g., theater, first run movies, sporting events or the like available, as on an extra fee basis, on the television receiver presently located in most leased rooms. This is, of course, in addition to providing normal commercial television programing broadcast by local stations without charge.

It is thus an object of the present invention to provide an improved private service communications system.

More specifically, it is an object of the present invention to provide a cable system for distributing commercial and supplementary video signals, addressing structure being provided to restrict viewing access to designated subscribers.

The above and other objects of the present invention are realized in a specific, illustrative system for providing restricted access one-way communications between common transmission equipment and plural subscriber locations via a distribution cable. The common equipment generates a signal ensemble which includes commercial video programing in its normal spectrum allocation; and supplementary premium video and digital addressing and command signals (as in the midband channel 6–7 gap).

The digital control information is coincidentally received and decoded at all (or a subset, such as one hotel or several) system subscriber stations. The digital signaling comprises a unique word-synchronizing binary pattern, followed by command and address digits in a prescribed word format. A transmitted control word may enable or inhibit reception of a specific program at a specifically identified address-subscriber station, or at all addresses.

The above and other features and advantages of the present invention will become more clear from the following detailed description of a specific embodiment thereof, presented hereinbelow in conjunction with the accompanying drawing, in which:

FIGS. 1A and 1B comprise the left and right portions of illustrative video distribution system equipment embodying the principles of the present invention;

FIG. 4 is a detailed block diagram of the downtown central control portion of the system of this invention.

FIG. 5 is a detailed block diagram of the hotel central control portion of the system of this invention.

FIG. 6 is a detailed block diagram of the room control unit of the system of this invention.

FIG. 7 is a schematic diagram of the local oscillators and frequency doublers of the room unit.

FIGS. 8A – 8C are representations of the profiles of the control signals utilized in this invention.

Figure 1B:
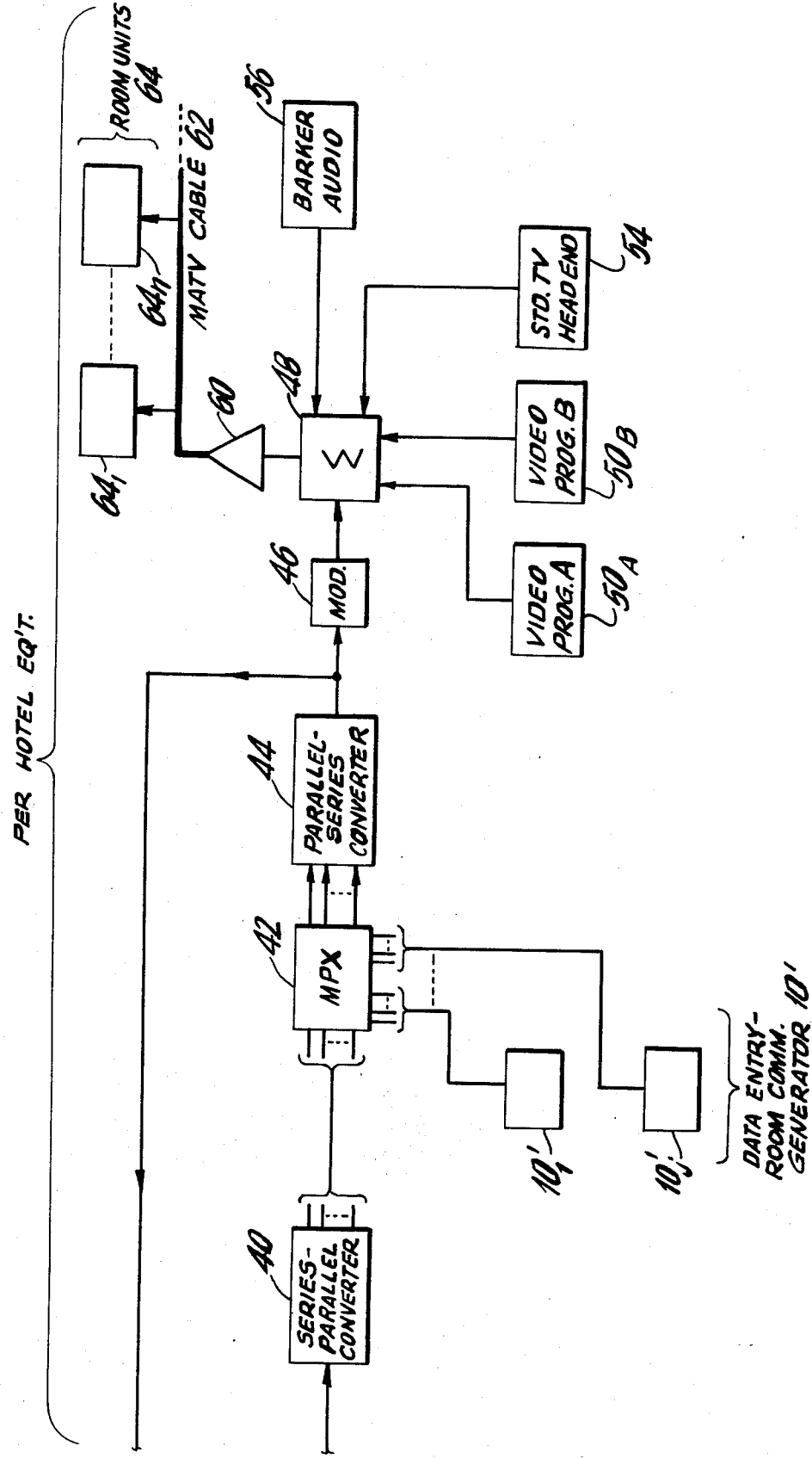

Referring now to FIGS. 1A and 1B, hereinafter referred to as composite FIG. 1, there is shown a private video distribution system in which a plurality of system subscribers, each having a room terminal unit 64 associated therewith, receive commercial locally available television programming and, selectively also, premium video information via a distribution channel 62, eg., a MATV cable in a hotel-motel context. A standard television signal recovering head end 54 supplies to a signal linear combining network 48 commercial, "off-the-air" television signals locally available at a hotel environment. Also supplied to the combining network 48 are first and second (A and B) premium video programs supplied by sources $50_a$ and $50_b$ thereof. The private programs may comprise first run movies, sporting events, theater presentations or the like.

Further supplied to the network 48 is a source of digital control information which controls the permissible mode of signal operation of each of the room terminal units 64 vis-a-vis reception of the premium A and B programs. Each data control message supplied by a modulator 46 comprises a binary word of fixed length and prescribed format. For purposes of concreteness, each word is assumed to comprise a leading word synchronizing digit group (e.g., eight consecutive binary 1's — this particular pattern is readily decoded, and also cannot exist as data with BCD coded information); followed by a group of command digits (e.g. three) which controls the mode of operation of a converter unit 64 identified by address bits; followed, in turn, by the address digits to identify a particular one of the units $64_1 - 64_k$ to receive the command. The repertoire of instructions may comprise, for example, enable reception of the A program 110; inhibit reception of A 100; permit reception of B 011; and inhibit reception of B 001. In addition, as more fully discussed below, a further particular control signaling format will permit simultaneous activation of all room terminal units to enable or inhibit all units coincidentally.

As a final input to the linear combining network 48, a barker or advertising audio message is supplied by a source 56 thereof and impressed on the cable via the summing network and a cable driving amplifier 60. The barker program may be used for any desired purpose such as providing constantly available advertising for the private video programs A and B, e.g., starting time, cost, reviews, viewing channel, and the like.

The various signals supplied to the linear combining network 48 by the sources 46, $50_a$, $50_b$, 54 and 56 may comprise any modulation form and frequency allocation desired. We have found it convenient and desirable to provide the commercial video material from the source 54 at the normally allocated channel frequency designations therefor, and to allot the remaining information to the frequency midband gap between channels 6 and 7. Further, we space the data carrier for the modulator 46 midway between the local oscillators at the room terminals 64 employed to receive the A and B programs for purposes below discussed, the barker carrier being disposed in a frequency-spaced relationship with respect to one of the local oscillators, e.g., that for the A program.

In accordance with the basic aspects of the present invention, a particular room unit 64 is afforded a particular mode of operation by a system room command generator 10. The generator 10 may comprise an element 10' located at the hotel, or the generator 10 may be located at some common (e.g., "downtown central") station. Plural local command generators 10' may be employed at the hotel such that video reception may be permitted from various locations (e.g., desk clerk, telephone operator and/or the like) responsive to a guest's request, the several generators being multiplexed via a multiplexer 42 of any common construction. Moreover, one or more of the generator 10 may be automatic in nature (e.g., in the form of stored tape message equipment or the like) to automatically transmit a number of successive unit 64 enabling-disabling messages. Similar automated equipment may be included among the room generators 10 at the common location.

To illustrate the basic nature of the room terminal control, assume that a guest in one of the rooms, e.g., that associated with a room terminal unit $64_i$ requests access to the A movie. Accordingly, a clerk at one of the local command generators 10' (e.g., $10_1'$) depresses keys at his console keyboard to generate a message comprising an address identifying the $i$-th room, and command keys with the enable A code. He views the message to be sent at his equipment $10_1'$ and, assuming it is correct, depresses an execute key which passes the address and command information to a parallel-to-series converter 44 via the multiplexer 42. The information supplied by the generator $10_1$ automatically includes the sync pattern as leading information. The full message comprising the sync, command, and address information, in that order, is converted from parallel to serial form by the structure 44 and supplied as a modulation input to the modulator 46. The control data from the modulator 46 is then impressed by the summing network 48 and amplifier 60 onto the cable 62 whereupon it propagates to, and is essentially coincidentally received by each of the room terminal units 64. In the manner described below only the particular room unit $64_i$ identified by the address portion of the transmission responds to the message and receives the enable A command.

It may sometime be desired to have a common station control room unit to distribute messages to a number of hotels or the like, as in a major city, convention environment or the like. To this end, data entry room command generators 10 may be employed at some common location. An enabled one of the generators 10 provides a control message in the manner described above with respect to a like generator 10'. That is, the parallel information from one of the generators 10 passes through a multiplexer 12; is converted to parallel form by a unit 16; is communicated to the hotel locations via data modems and communication channels 24; and is converted at the hotel to parallel form by an element 40 to serve as additional inputs to the local command selecting multiplexer 42. Moreover, if desired, a permanent record generator 28 may be employed to record (as for billing) all commands issued at either the common or hotel locations, reverse transmission from the hotels to the generator 28 being provided by data modems - communications channels 26 as desired. Specific embodiments for the digital multiplexers 12 and 42, parallel-to-series converter 44, series-to-parallel converter 40, data modems and communications channels 24 and 26 will be readily apparent to those skilled in the art, as are the various control configurations for merging information generated by plural generators.

Figure 2:
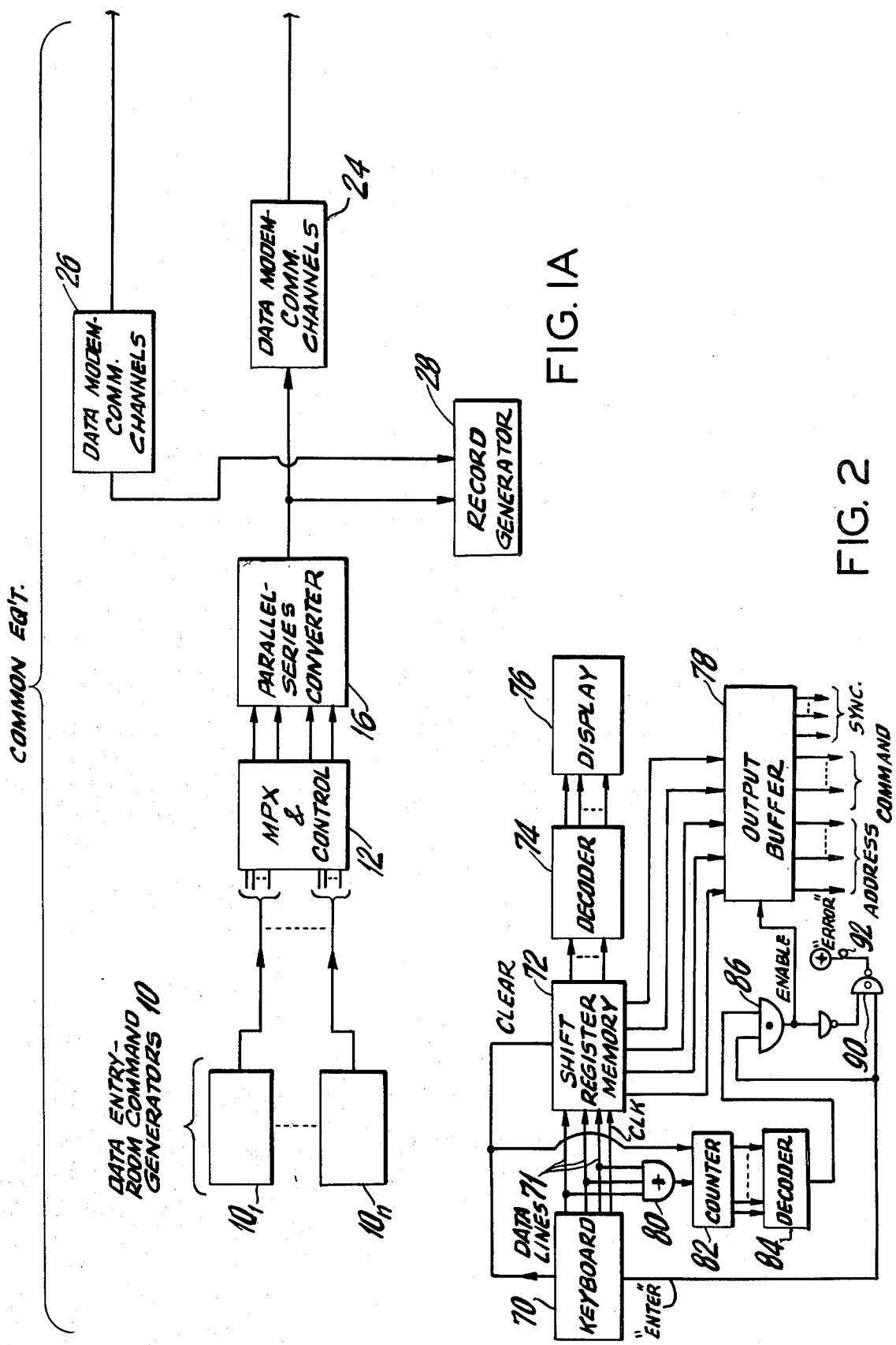
FIG. 2 depicts a command generator employed in the system of FIGS. 1A and 1B.

An illustrative embodiment for a room control generator 10 or 10' is shown in FIG. 2 and comprises a data entry keyboard 70 which supplies serial information shifted via a plurality of data lines 71 into a shift register memory 72. The contents of the memory 72 are decoded at an element 74 and displayed in a display 76 such that the operator can visually inspect the developing address and command message portions to verify their accuracy. When an enter key on the keyboard 70 is depressed, output buffering gates 78 are normally enabled by an AND gate 86 and the contents of the buffer 78 supplied to the multiplexer. The output of the buffer 78 comprises a sync pattern of fixed digits, and command and address digits entered at the keyboard.

As a verification measure, an OR gate 80 connected to each of data lines 71 signals a counter 82 each time an information key is depressed, the outputs of the counter 86 being decoded at a decoder 84. The decoder 84 will enable the AND gate 86 only when the proper number of message characters has been produced (i.e., the prescribed number of address bits and command bits) such that the enter key cannot activate the output buffer lines unless the proper number of message bits has been entered. If the enter key is depressed at any other time, a coincidence gate 90 is fully enabled and illuminates an error lamp 92. If the operator is dissatisfied with the message or makes an error, he may simply clear the memory 72 and counter 86.

Figure 3:
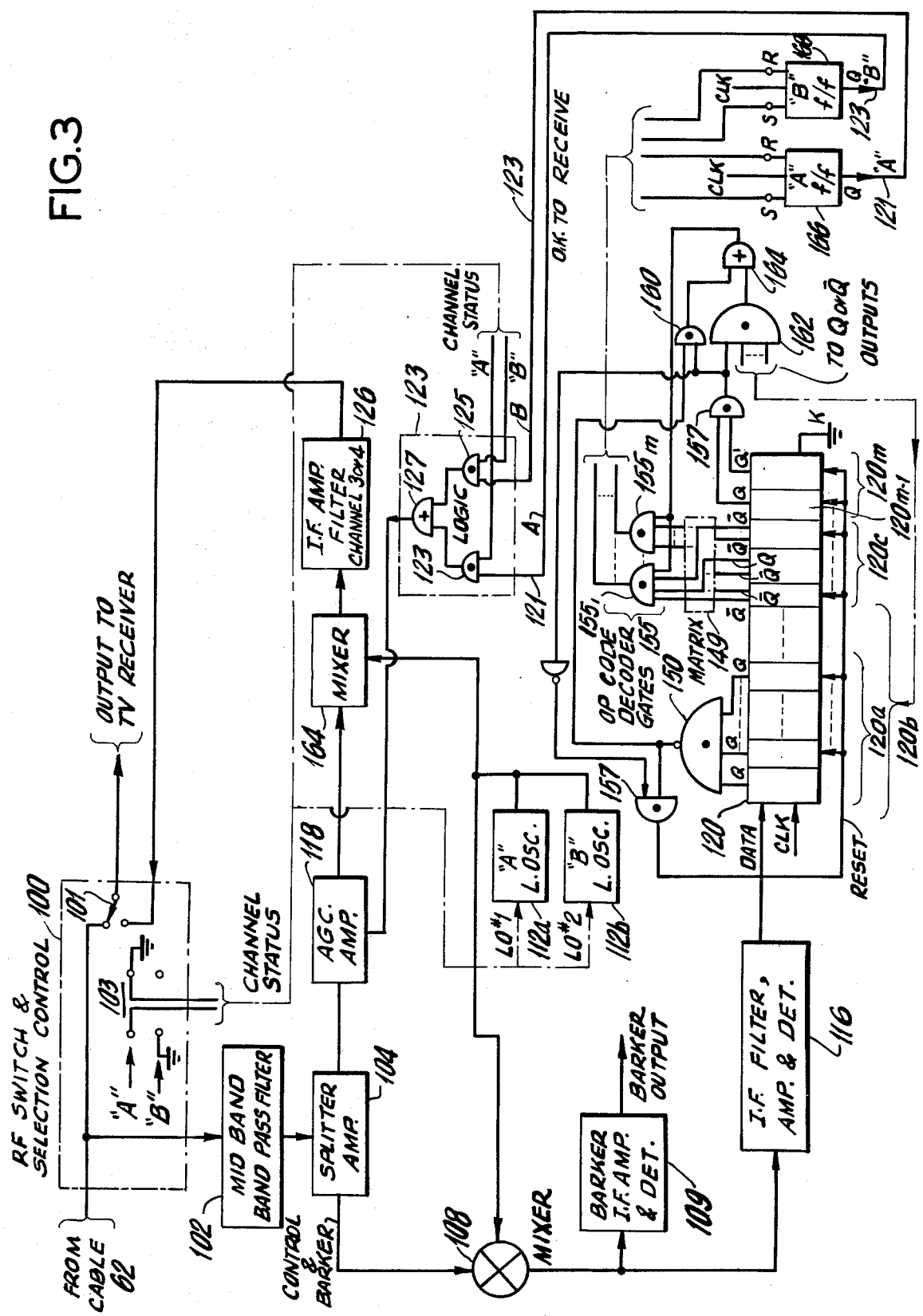
FIG. 3 depicts room terminal equipment which selectively permits reception of private video signals at the several system subscriber locations.

Turning now to the room terminal equipment shown in FIG. 3, equipment 64 is connected to the MATV cable 62 by radio frequency and selector control switch apparatus 100, the output of the unit 100 being connected to the antenna terminals of standard television receiver at the subscriber room. When a radio frequency switch 101 in the unit 100 connects the room receiver directly to the cable (the upper transfer contact position shown in the drawing) the television receiver receives all of the commercial video programing, but not the private information which is lost in the receiver midband.

To receive private programing, the transfer (output) contact of the switch 101 is connected to its lower position, and the receiver tuned to a locally unused channel, e.g., the spectrum of unused channel 3 or 4. Further, an A-B private video channel status selector switch 103 is placed in an A or B position depending upon whether the A or B program is to be viewed.

The signals in the midband spectrum received at the converter terminal 64 are selected by a band pass filter 102 and passed through a splitter amplifier 104 to each of an automatic gain control amplifier 118, and a mixer 108. Further, one of two gated local oscillators $112_a$ and $112_b$ is turned on by the state of the private channel selector switch 103. The output of the active oscillator $112_a$ or $112_b$ is supplied to mixers 108 and 164.

The signals supplied to the mixer 108 comprise one of the A or B program reception enabling local oscillators $112_a$ or $112_b$ and the entire midband spectrum. A first IF filter-amplifier and detector 116 connected to the output of the mixer 108 is tuned to a frequency given by one half of the difference in frequency between the outputs of the two local oscillators $112_a$ and $112_b$. Accordingly, no matter what the position of the switch 103 (i.e., whether the A or B program is desired), the IF amplifier and detector 116 continuously recover control data (i.e., recover the modulation from the output of element 46 by conventional heterodyning-detection), and supply the serial control data bit stream to the data input of a shift register 120 at the receiver 64. Thus, at each room terminal unit 64, all data impressed on the MATV cable continuously flows through a shift register 120 there contained. Further, it is assumed here that bit synchronization is provided by using a common 60 cycle power line rate and phase for all equipment items of the composite FIG. 1 system, although bit sync and phase may be obtained in any manner well known to those skilled in the art, as from the data bit stream per se.

A barker IF filter-amplifier and detector receives the beat product outputs of the mixer 108, and is tuned to receive signals of a frequency band given by the difference between the A program local oscillator $112_a$ and the barker carrier above described. Thus, when the transfer switch 103 is in the receive A position (upward in FIG. 3) the barker audio program is received, heterodyned and demodulated by the equipment 109, and reproduced via an amplifier and loudspeaker at the room converter terminal 64 (this reproduction equipment not being shown for purposes of conciseness).

By way of general overall operation, the premium video programs passing through the band pass filter 102 and splitter amplifier 104 are supplied to the variable gain amplifier 118 where they are selectively passed or blocked under the control of an AGC control signal ("CONTROL") developed by a combinatorial logic network 122. The CONTROL output of the logic network 122 passes video signals through the amplifier 118 when:

a. reception of the A program is permitted (an enabling signal or a lead 121 [from an "OK to receive A" command preserving flip-flop 166] to partially enable an AND gate 123) and the A program is desired at the room terminal (a 1 input [a high level voltage or an open circuit for conventional current sinking integrated circuit logic gates] from the A channel status output of the switch 103 which fully enables the gate 123); or (an OR gate 127 is enabled when the logic condition for either of two AND gates 123 or 125 is satisfied), b. reception of the B program is permitted (a logical one on a lead 123 to partially enable the AND gate 125) and the selector switch 103 choses the B program (a high B output line from the selector switch 103 to fully enable the AND gate 124); and not otherwise.

The setting of the selector switch 103 enables a selected one and only one of the local oscillators $112_a$ or $112_b$ as above described, and that oscillation is supplied to the mixer 164. Assuming that reception of the program corresponding to the switch 103 selection has been authorized, the logic structure 122 CONTROL signal passes both premium video programs through the AGC amplifier 118 to the mixer 164. Thus an output IF filter-amplifier-detector connected to the mixer and tuned to channel 3 or 4 as locally appropriate then extracts the proper one of the two private programs for viewing dependent upon the particular local oscillator 112 which is energized. This obtains by scaling the frequency difference between the A program local oscillator $112_a$ and the A program supplied by the source $50_a$ to identically correspond to the channel 3 or 4 band, a like relationship obtaining between the B program and the B local oscillator frequency. The selected program at the output of the IF amplifier-filterdetector 126 is then connected by the switch 103 to the subscriber television receiver where it is viewed by simply tuning that receiver to the appropriate one of channel 3 or 4.

Focus will now be placed upon the operation of the control portion of FIG. 3 converter terminal unit. All data on the cable steps through the shift register 120 at the room terminal 64, the shift register comprising, for example, cascaded J-K flip-flop stages. When a sync pattern is first received, a binary one resides in each one of the first eight shift register stages $120_a$ and an AND gate 150 connected to the Q outputs of the eight flip-flop stages is fully energized. The output of the AND gate 150, acting via a normally otherwise activated AND gate 151, responds to the sync pattern by clearing (resetting) all of the shift register stages, except for the first stage. Thus, upon sync recognition, the first shift register stage contains a binary one while all other shift register stages contain a binary 0.

The succeeding message digits are then received until the initial 1 and 0 in the first two shift register stages upon sync recognition have propagated to reside in the last two register stages $120_{m-1}$ and $120_m$. When this condition obtains, the command message bits reside in a shift register portion $120_c'$ and the address information resides in shift register $120_b$.

The 1 − 0 pattern in the final two register stages is decoded by a coincidence gate 157 which responds to this condition by partially enabling a coincidence gate 162 having its remaining inputs connected to the Q or Q' output of each shift register stage of address stages $120_b$ in a unique pattern corresponding to and establishing the particular address of the unit. If the message is not for the particular unit 64, the input conditions for the AND gate 162 will not be satisfied, ie., all inputs thereto will not be 1's since one or more address digits will have a 0 at the Q or Q' output to which inputs of the gate 162 are connected. However, if the message is for the converter, the address decoding gate 162 will receive all ones at the address input portion thereof and fully switch to enable a plurality of command decoder gates 155 via an OR gate 164.

The Q and Q' outputs of the command storing flip-flop register stages $120_c$ (assumed to be three in number) are supplied to a distribution matrix 149, and, therefrom in selected mutually distinct patterns, to the inputs of the command decoding gates 155. Thus, for example the gate $150_1$ decodes an "enable reception of A" 110 pattern by connection to the Q, Q and Q' outputs of the three stages which are all high only when an enable A command signal is being propagated. Thus, when all gates 155 are conditioned by the OR gate 164 when the message is destined for the particular converter terminal, the incoming command fully enables one and only one of the gates 155.

The outputs of the gates 155 (one high of $n$) are coupled to command storage flip-flop 166 and 168 which are respectively associated with reception of the A and B video programs. That is, when the A and/or B flip-flops 166 and 168 are set, reception of the A and-/or B video programs is permitted, respectively, and not otherwise. The outputs of the gates 155 may therefore directly energize the set and reset inputs of the flip-flop 166 and 168 to selectively enable or inhibit reception of the premium programs. The particular manner in which a set flip-flop 166 or 168 operates in conjunction with a particular setting of the switch 103 to permit reception has been considered hereinabove with respect to the discussion logic circuitry 122.

It is sometimes desired that a particular command be given to the entire ensemble of room terminal units, as to permit reception of one of the signals or to inhibit a channel at all locations after a particular program ends to initiate a new ordering-access and billing cycle for a succeeding program. To this end, a particular message comprising a sync pattern, the particular command, and another sync pattern in the final eight address positions is generated. For this "all call" message, the AND gate 150 will be energized by the eight all call digits at the same time that the gate 157 is enabled by the 1–0 pattern produced by the initial message sync pulse group. Accordingly, a gate 160 is switched by the gates 150 and 157 and enables the OR gate 164 which conditions all command decoders 155 at all subscriber locations such that the command residing in the shift register stages $150_c$ is executed in the manner above discussed. It is observed that the address decoding gate 162 is by-passed in this all call mode since that address gate cannot be satisfied for more than any one unit.

It is also observed that the final shift register stage $120_m$ is adapted to latch in the one state following the first one entered therein (by the shifted final sync bit) as by a grounded K input. Thus, the AND gate 157 (and the command decoders 155) cannot be spuriously activated by an arbitrary data bit pattern propagating through the register 120. To the contrary, once set, the control electronics of FIG. 3 require another sync recognition (to reset the register stage $120_m$) before another command can be entered therein.

The above described system arrangement has thus been shown to provide for restricted access, under control of enabling commands, to premium video programming in a cable distribution context.

The above described arrangement is merely illustrative of the principles of the present invention. Numerous modifications and adaptations thereof will be readily apparent to those skilled in the art without departing from the spirit and scope of the present invention.

The operation of the previously described system will now be described in a more detailed fashion. The system of this invention includes a "downtown central" sending station to transmit commands selectively to unique ones of a collection of "room units" for selectively enabling and disabling video reception of a plurality of "premium" or "secure" channels. The room units are divided into groups, a group constituting a collection of room units located for example, solely in one hotel. The downtown central installation is capable of addressing selectively any room unit in any group of the plurality of groups of room units. Additionally, there is included in the system of this invention an installation designated "hotel central". One hotel central installation is connected to address only the room units within its corresponding group of room units, e.g., in the specific hotel in which hotel central is located.

The preferred form of this invention utilizes a format of address and command such that each group of room units, e.g. each hotel, is identified by two decimal digits. Each room unit within each group of room units is further identified by a unique five digit decimal number.

With respect to the command format, the preferred form of this invention involves the use of four separate command signals. These four command signals can be identified and carried in the form of a succession of three binary digits, or "bits". Needless to say, one skilled in the art could modify the system of this invention to utilize a format having different numbers of digits than those set forth in this preferred embodiment, or to use number systems other than binary or decimal. Moreover, one skilled in the art could also incorporate command signals encompassing more or less than four commands, by simply altering the number of binary digits used in transmitting the command. Here, however, for purposes of clarity, the system will be discussed with respect to the preferred format as set forth above.

DOWNTOWN CENTRAL

FIG. 4 illustrates in block form the "downtown central" control and sending center. Keyboard 70 includes two major components, and a number of ancillary ones. Address keyboard 70a includes a panel of keys including the decimal numbers 0 through 9. Connected to the output of address keyboard 70a is pulse stretcher 70c. Pulse stretcher 70c, as shown, has 10 output lines, one output line corresponding to each decimal digit for which a key is provided on address keyboard 70a. Address keyboard 70a and pulse stretcher 70c cooperate such that, when a key is depressed on address keyboard 70a, an output appears on that output of pulse stretcher 70c which corresponds to the decimal digit associated with the key which is punched. It is noted that pulse stretcher 70c is utilized in order to provide that the output pulses from keyboard 70 are of relatively uniform duration, and are not dependent on the length of time the key is depressed.

It is noted that keyboard 70 includes a converter 70d for converting the decimal digit output of pulse stretcher 70c to a binary coded decimal output. By the term "binary coded decimal" is meant that each decimal number is represented by a group of four binary digits. For example the number 9 could be represented by the binary number 1001, the number 6 could be represented by binary 0110, etc. Thus, converter 70d has four outputs 71 as shown in FIG. 4. With respect to the command signals, it is noted that each of the four commands of the preferred embodiment may be represented by a different combination of three binary digits. It can therefore be seen that if one considers only the right hand three digits of the binary output of converter 70d, any of the four commands can be represented by a single decimal digit in view of the fact that each of the decimal digits are converted to binary coded decimal form by converter 70d. For example, if the four commands which are possible are set out to be expressed as 110 (B ON), 011 (A ON), 100 (B Off), and 001, (A off), each of these groups of three binary numbers will be generated by converter 70d upon the receipt by the converter 70d of the decimal numbers 6, 3, 4, and 1, respectively. Command keyboard 70b, similar to address keyboard 70a, is provided with generation capability for these four decimal numbers, which are input to converter 70d.

Converter 70d can consist of four OR gates connected to the output of a matrix whose input is attached to the 10 output lines of pulse stretcher 70c. The construction of such a device will be readily apparent to one skilled in the art.

Command keyboard 70b may optionally include a command display 70e, which simply registers in visual form whatever command number is keyed into command keyboard 70b.

Each group of 4 outputs from converter 70d in binary coded decimal form, is an input to a shift register memory 72, which receives and registers each binary coded decimal digit transmitted from the converter 70d. Shift register 72, in this preferred embodiment, has a total of 32 cells. This number of cells can accommodate eight BCD digits. Recalling the format of the preferred embodiment, these eight digits can be allocated as follows:

Two digits for the hotel address, five digits for the room unit address, and one digit including the three binary bit command information.

A BCD to decimal decoder 74 is connected to the several cells of shift register 72. Decoder 74 produces eight separate outputs. Each output represents the decimal equivalent of a different group of four binary bits (each constituting a BCD number) which is registered on shift register 72. A display 76 connected to decoder 74, renders a visual display of this decoded information. Such a display device can consist of lighted tubes each capable of assuming a visual representation of decimal numbers from 0 through 9, such as the commonly known "NIXIE" light.

Each cell of shift register 72 is connected to an output buffer 78. The function of output buffer 78 is to interface the 32 binary bits (eight BCD digits) residing in shift register 72, with a multiplexer described below. Thus, output buffer 78 also has 32 separate input and output lines.

It can thus be seen that when an operator keys 7 decimal address digits from address keyboard 70a, and one decimal command digit from command keyboard 70b, these signals, converted to BCD form, reside in shift register 72 and a separate visual representation of their residence is made at display 76. Thus, the operator can view the contents of shift register 72 before they are transmitted.

Means is also provided whereby an indication is made to the operator whether a properly compatable input signal has been keyed from the keyboard into shift register 72. An OR gate 80 is connected at each of its inputs to a different one of the ten output lines of pulse stretcher 70c. Thus, OR gate 80 emits an output whenever a digit is keyed into the system from either the command or address keyboard. Ripple counter 82 is provided to count these outputs of OR gate 80. Decoder 84 connected to the output of ripple counter 82, emits a signal partially enabling AND gate 86 when the number of digits keyed into shift register 72 equals 8.

The remaining input of AND gate 86 is actuated by receipt of a signal from sending unit 70f located on the keyboard. It can be seen that this equipment provides that, when the number of BCD digits in shift register 72 is just sufficient to fill the register, the actuation of sending unit 70f by the operator will cause AND gate 86 to emit an enabling pulse which is directed to output buffer 78. Output buffer 78 includes 32 two-input AND gates, each connected at one input to a different cell of register 72. The other input of each AND gate is coupled to the enabling output of AND gate 86. Output buffer 78 is thus constructed such that it "stores" the 32 binary digits represented by the 32 outputs of shift register 72 until such time as the enabling signal is received by the output buffer, which signal enables the output buffer to transmit the 32 binary digits outward over the output buffer output lines.

Thus, an interlock is provided such that the actuation of the sending unit 70f will not cause output buffer 78 to release and transmit the signals residing in shift register 78 unless the proper number of digits has been keyed into shift register 72 from the keyboard 70.

Additionally, the output of AND gate 86 is connected by way of inverter 90a to one input of AND gate 90. The other input to AND gate 90 is from sending unit 70f. The output of AND gate 90 is connected to an error display lamp 90b. The function of this portion of the apparatus is to provide an inpulse to light error lamp 90b when the sending unit is actuated, providing that no enabling signal is generated by AND gate 86. Therefore, when an improper number of digits are keyed into shift register 72, and the operator actuates sending unit 70f, no enable signal will go to output buffer 78, and error lamp 90b will light.

Clearing means 70g is provided and connected to the command and address keyboards, the displays, and shift register 72, so that the operator may, if she or he wishes, clear an improperly keyed message from the system before it is sent. Display lamps may be connected to each of sending units 70f and clearing means 70g in order to indicate the actuation thereof in a visual fashion.

MULTIPLEXER AND TRANSMISSION PATH

The 32 output lines of output buffer 78 are fed into multiplexer 12. It is noted that a plurality of downtown central units 10 may be input to multiplexer 12. Multiplexer 12 contains a plurality of 32-line sets of input terminals for receiving the 32 output terminals of the output buffers associated one with each of the downtown central units 10. The utility of such an arrangement is that it is often desirable that a plurality of operators be employed at downtown central on a virtually simultaneous basis to transmit the large numbers of address and command signals rapidly to various room units in the system. Multiplexer 12 makes it possible to time-share a plurality of the downtown central units to interface them onto a single output transmission line. Multiplexer 12 may be simply an elaborate timed switching device which successively connects to the output line only one downtown central unit 10 at a time. Multiplexer 12 thus "polls" successively each of the downtown central units in order to transmit whatever information is contained in the output buffer (and shift register) of each unit.

Multiplexer 12 in this preferred embodiment has a number of output lines equal to the number of output buffer 78, in this case 32. These 32 output lines are directed as inputs to a shift register 16 which functions as a parallel to series converter for the information transmitted from output buffer 78 by way of multiplexer 12. Shift register 16, operating in response to clock pulses input thereto, simultaneously receive all 32 input signals of each group from multiplexer 12, and transmits them, one at a time, as series data over line 16a. These series data signals are then transmitted via modem 24 over cable 25 to the hotel central unit as shown in FIG. 5. Modem 24 is connected through terminals T—T.

HOTEL CENTRAL

Interposed on the cable at the input of each hotel central unit (there being one hotel central unit for each hotel or other group of units) is hotel decoder 41. Hotel decoder 41 functions to decode the first 2 digits of the address, which digits, as noted above, identify the hotel (or other group of room units) to which the remainder of the information of the data is directed. If an incoming message is not for the hotel with which the hotel central unit is associated, as indicated by the first 2 address digits, the hotel decoder 41 blocks the transmission of that message to the hotel central unit. If, on the other hand, the message is, as indicated in the first 2 address digits, directed to one of the room units in the hotel with which the hotel central unit is associated, hotel decoder 41 strips off the first 2 address digits indicating the hotel (which means that it strips off the first eight binary bits of the 32 bit message presented in BCD) and transmits the remaining binary information to shift register 40. Shift register 40 functions as a series-to-parallel converter of the series information, by successively receiving and storing in each of its 24 cells the six BCD digits remaining after the removal of the first two BCD digits.

Shift register 40 directs the 24 line output to multiplexer 42. Multiplexer 42 operates in the inverse fashion as multiplexer 12, except that multiplexer 42 only deals with groups of 24 line outputs, whereas multiplexer 12 dealt with 32 bit binary messages. Also input to multiplexer 42 is one or more hotel command generator units 10'. Hotel command generator units 10' are similar to downtown central units 10, except that hotel command generators 10' need not process or transmit to multiplexer 42 any digits corresponding to the hotel address. Thus, hotel command generator units 10' may process only a five digit room address (decimal) and the one decimal digit command.

The 24 outputs of multiplexer 42 are directed to shift register 42a which is a parallel-to-series converter. The function of parallel-to-series converter 42a is to enable the transmission of the data in series form simultaneously to all the room units of the group.

The output of parallel-to-series converter 42a, which is series data, is directed by way of data line 46a and connections U—U to modem 26 and to record generator 28 (FIG. 4). Record generator 28 may be any suitable type of logging apparatus for recording in a permanent fashion all the messages sent from the hotel command generator units 10' and from downtown central units 10. This is to enable proper billing and accounting, along with perhaps audience survey. Record generator 28 may be a punched tape generation device, which produces a tape bearing indicia which may be decoded to indicate the messages received and transmitted by parallel-to-series converter 42a.

MODULATION

The series data output from parallel-to-series converter 42a is also directed to a modulator 4 (FIG. 5). Modulator 46 modulates the series data received in AM fashion on a carrier having a frequency, in this preferred embodiment, of 110.5 MHz. The modulated data signal is directed as an input to mixer 48. Mixer 48 also receives as inputs at least one video channel which is a secure or premium video channel whose reception is to be governed by the system of this invention. In this preferred embodiment two video channels, A and B, are input to mixer 48 from video sources 50a and 50b. In the preferred form of this invention, these video channels are amplitude modulated onto carriers having frequencies of 148.75 MHz and 170.75 MHz respectively. The selection of these frequencies is explained below. Also directed to mixer 48 is the conventional television broadcast band received by the hotel MATV 54. Additionally, input to mixer 48 is a barker audio signal from barker source 56. In the preferred form of this invention, the barker audio signal is amplitude modulated on a carrier having a frequency of 105.455 MHz, for reasons which will become more clear below.

The signal from mixer 48 is then directed through amplifier 60 and placed on a cable 61 which is directed to each of the room units in the hotel (or other group of room units) associated with the "hotel central" equipment.

ROOM UNIT

A typical room unit is illustrated in FIG. 6. Cable 61 bearing signals corresponding to the data, video channels A and B, the conventional television broadcast channels, and barker audio is directed to the input of selector switch 100*a*. Selector switch 100*a* preferably is ganged to respond to the position of front panel switch 100*c*. Front panel switch 100*c* has three positions, one position indicated TV, and a position for premium channel A and one for premium channel B. When front panel switch 100*c* is turned to the TV position, all the signals from mixer 48 are directed over cable 61 to switch 100*a*, and subsequently by line 101 to the selector switch 100*b* which couples the signal to the television receiver. Thus, when front panel switch 100*c* is tuned to the TV position, the entire signal presented to the input of the television receiver, enabling the conventional reception of the standard broadcast television channel.

PREMIUM CHANNEL RECEPTION

When, however, front panel switch 100*c* is tuned to the A or B positions, a different series of events takes place. The local oscillator 112*a* or 112*b*, corresponding to the selected channels A or B (oscillators 112*a* and 112*b* corresponding to channels A and B, respectively) is actuated by the turning of front panel switch 100*c* to the A or B position, Additionally, when front panel switch 100*c* is turned to the A or B position, the signals coming in over cable 61 are directed through filter 102 which is a relatively wide band pass filter (40–166 MHz) to strip off spurious signals which may be present on the cable to a splitter 104.

From splitter 104, the signals go along one path through a video band pass filter 105 (138–166 MHz), and to a variable gain amplifier 118. Variable gain amplifier 118 has a gain which is variable depending on the presence or absence of a signal appearing at input 118*a* thereto. The output of variable gain amplifier 118 is directed to video mixer 164. The other output of splitter 104 directs the signal through a relatively narrow band pass filter 104*a* (105–116 MHx).

Thus, the signal thereby input to mixer 108 includes the data channel, having the frequency of 110.5 MHz.

The signals from local oscillators 112*a* and 12*b*, are 105 MHz and 116 MHz, respectively. Oscillators 112*a* and 112*b* are controlled by the position of switch 100*c*, oscillator 112*a* being turned on when switch 100*c* is in the A position, and 112*b* when in the B position. The outputs of each local oscillator is directed to mixer 108, along with the data signal. Thus, mixer 108 mixes the data signal (110.5 MHz) and the signal from one of local oscillators 112*a* or 112*b*.

The beating of the data signal at 110.5 MHz with either the 116 MHz or 105 MHz signal from the actuated one of the local oscillators will invariably yield a signal having a frequency of 5.5 MHz, which signal will uniquely bear the data. Thus, means can easily be provided to demodulate the data signals which eminate from mixer 108. For this purpose is provided a 5.5 MHz filter 116*a*, which filters off the remaining signals on the output of mixer 108 and directs the data signal to an RF amplifier 116*b*, from whence it is in turn directed through AM detector 116*c*, and through an audio amplifier 116*d*. The raw data, it can be seen, now appears without other signals on data output line 116*e*. The application of these signals is discussed herein below.

Note that the barker signal is displaced from the frequency of local oscillator 112*a* by 455 KHz. Therefore, whenever local oscillator 112*a* is actuated, the beating of the barker signal with the output signal of local oscillator 112*a* in mixer 108 can be employed to yield a barker audio signal having a frequency of 455 KHz. This can be done by the use of filter 109*a* having a narrow pass band centered around 455 KHz, from the which the filtered barker signal is directed to RF amp 109*b*, and subsequently to AM detector 109*c*, and audio amplifier 109*d*, from which the demodulated barker audio signal may be presented in an evident manner by means of speaker 109*e*. Optionally, automatic gain control 109*f* may be employed to render the ouptut of the barker audio more uniform.

Referring once more to local oscillator 112*a* and 112*b*, it is noted that the output of whichever of local oscillator 112*a* or 112*b* is actuated is transmitted to a frequency doubler 113 which doubles the frequencies of the local oscillators to 210 MHz and 232 MHz, respectively. The doubled local oscillator signal is passed through band pass filter 113*a*, having a band pass of 204 to 232 MHz. The doubled output from filter 113*a* is then directed to video mixer 164. Premium channel signals A and B are also input to mixer 164, through variable gain amplifier 118.

As noted above, the frequencies of the secure channels A and B are 148.75 MHz, and 170.75 MHz respectively. These frequencies and the doubled frequencies of the local oscillators are chosen such that, when the doubled frequency of local oscillator 112*a* is mixed with the frequency of channel A, there is yielded a signal bearing the informtion on channel A which is of a frequency corresponding to that of one of the standard broadcast television channels. The standard broadcast television channel is chosen to be one which is unused in the local area, such as channel 3 or 4. Correspondingly, when the doubled output of local oscillator 112*b* is mixed with the signal of channel B, that signal is likewise converted to the same standard broadcast television channel to which the channel A signal is converted by the mixing of the channel A signal with the doubled output of local oscillator 112*a*. The converter signals of premium channels A and B are passed to the TV receiver on the same path as are the standard broadcast MATV signals.

It is therefore evident that, if one assumes that the variable gain amplifier 118 is operating at its high gain position, one of channels A or B will automatically be converted to a conventionally receivable television channel, depending on which of the local oscillators 112*a* or 112*b* is operating. Furthermore, as noted above, the position of the manual dial on front panel switch 100*c* determines which of local oscillators 112*a* or 112*b* is to be actuated.

Furthermore, it is seen that positioning the data signal carrier frequency half way between the frequencies of local oscillator 112a and 112b enables the data signal to be demodulated and produced no matter which of oscillators 112a or 112b is operating.

It is also seen that the barker signal is processed and produced at loudspeaker 109e whenever and only whenever local oscillator 112a is actuated.

It is the necessary consequence of the above that the receivability of secure channels A and B is determined by whether the variable gain amplifier is at its high or low gain state, and that this is determined by the presence or absence of a signal at input 118a to variable gain amplifier 118. The succeeding discussion will relate to apparatus for processing the data signals by means of logic in such a way that reception of channels A and B can be controlled with respect to each individual room unit.

ROOM UNIT LOGIC

The data signal is expressed as 23 binary bits 20 binary bits are used to express, in BCD form, a five digit decimal address number pertaining to a particular room unit. The remaining three binary bits contain the command information, i.e., one of four commands which can be executed by the room unit. These commands are to enable reception of channel A, disable reception of A, enable reception of B, and disable reception of B.

In addition to the data signals which are transmitted from the hotel command generator units 10' and from the downtown central units 10, an additional synchronizing signal is automatically placed ahead of each set of data which is received at the hotel central unit. This is done by means of a sync generator 14a coupled to the output of each hotel command generator 10' and to the signal transmitted to the hotel central from the downtown central (FIG. 5). Sync generator 41a functions to add a series of eight binary ones before each address and command message which is received at the hotel. The function of this synchronizing signal, which will be set forth in more detail below, is to "alert" all the room units receiving the synchronization signal, to the fact of an impending address and command message, which should be "heard". The synchronization signal distinguishes the pulses coming in over the line from random or spurious ones (FIG. 5).

The installation for recognizing and responding to synchronization, command and address signals comprises a shift register 120, having 25 cells, (1–25) in this preferred embodiment (FIG. 6).

The total message received at each unit in a hotel, whenever a message is directed to one of the group of room units in the hotel, is eight binary one bits, followed by three binary command bits, followed by twenty binary address bits representing in BCD form a five-digit decimal address for the room unit to which the message is directed.

The data, as has been pointed out above, arrives at the room in serial form, to be recorded by shift register 120. The first signal to arrive at shift register 120 is the 8 one bit synchronization signal. This signal marches into shift register 120 until cells 1–8 thereof are each occupied by one of the bits of the 8 one bits of the synchronization signal. A sync reset AND gate 150 is provided, having one input directed to a different one of each of cells 1–8, for the purpose of responding to and recognizing the presence of a synchronization signal having entered shift register 120. Upon receipt of the eight one bits in cells 1–8, AND gate 150 generates an output which drives buffer driver 150a to provide an output which resets to zero all the cells of shift register 120 except for the first cell i.e., cells 2–25. This serves to remove any spurious signals which may be present already in the shift register 120 and to set up in cells 1 and 2 thereof a particular "marker" combination of two logical bits which can, in a manner described below, be utilized later in the information processing of the room unit.

Once having recognized the sync signal and having reset cells 2–25, the room unit continues to receive the remainder of the command and address data, which, as noted above, consists of 3 logical command bits, followed by 20 logical address bits, representing in BCD form the five decimal digits room address.

Each of cells 24 and 25 is connected to one input of AND gate 157a in such a way that AND gate 157a produces an output only when cell 24 contains a one bit and cell 25 contains zero bit. Recall that cells 1 and 2, after the clearing operation contain a 1 and 0 bit, respectively.

From the description of the preceding apparatus, it can be seen that, when the cells 2–25 have been cleared, the remainder of the information or data will march through shift register 120 until that point is reached at which the one bit present in cell 1 immediately after the clearing operation resides in cell 24. Since cell 2 has a zero bit at the end of the clearing operation, cell 25 will have a zero bit when cell 24 has the 1 bit which was originally in cell 1.

The output of AND gate 157a generated by the 1–0 condition of cells 24 and 25 partially enables address recognition AND gate 162, and also by connection to the buffer driver 157 disables any further resetting of shift register 120.

The remaining inputs of address recognition AND gate 162 are each connected to a different one of cells 1–20 of the shift register 120. It can be seen, then, that when each of the binary digits in cells 1–20 conforms to a predetermined condition AND gate 162 will be actuated to emit an output.

Cells 1–20 of shift register 120 can each be provided with a potentiometer device which, by setting in a manner apparent to one skilled in the art, can determine the precise combination of condition of cells 1–20 which will cause the actuation of AND gate 162 to render a positive address recognition. For example, if a potentiometer for a particular cell is set at a low level, then the AND gate 162 input to which that cell is attached will individually be actuated by a zero logical bit in that cell. Conversely, if the potentiometer is at a high setting its associated input to AND gate 162 will be actuated by one bit in that cell. The shift register 120 of each room unit can be preset to any given address.

It can therefore be seen that after the command (three bits) and address (20 bits) have marched into cells 1–23 of shift register 120, an address recognition function is automatically performed by AND gate 162. If AND gate 162 is not actuated by the recognition of its unique address, nothing further happens. If, on the other hand, AND gate 162 is actuated, it generates an output to OR gate 164. OR gate 164 then responds with a "command enable" output which is directed to partially enable each of four command decoding AND gates 155. Each command decoding AND gate 155 has two inputs, one to accommodate the command enable signal from OR gate 164, and the other to accommodate one input from a matrix 149 which is used to decode the command message presented in the three command bits, which, under the circumstances, reside in cells 21–23 of shift register 120.

Thus, the recognition of the unique address by the room unit AND gate 162 further enables the decoding of the command contained in the command digits in cells 21–23.

Matrix 149 contains one input from each of cells 21–23. The matrix is constructed with four outputs. The construction of the matrix is such that its output depends upon the condition of the binary bits in cells 21–23. The matrix emits one, and only one, output for each three-bit command combination of the three command bits in cells 21–23.

Thus, by way of the matrix decoder, a different one of command decode AND gates 155 is actuated for each command residing in cells 21–23. The one of AND gates 155 which is actuated depends on which command combination is present.

The outputs of AND gates 155 are directed to flip-flops 166 and 168. Each flip-flop receives the output of 2 of AND gates 155. Flip-flops 166 and 168 are so constructed that when one input of flip-flop 168 is actuated, the flip-flop latches in a positive output position, whereas when the other input is received, it resets to a zero output condition. The same is true of flip-flop 168 with respect to the other 2 AND gate outputs from AND gates 155.

To recapitulate, after the address recognition has taken place, AND gates 155 are enabled to cooperate with Matrix 149 to decode the command signal present in cells 21–23, and this decoding results in the setting or resetting of one of flip-flops 166 and 168.

The outputs of flip-flop 166 and 168 are used by means of further logic circuitry to determine whether variable gain amplifier 118 is to operate in its high gain or low gain mode.

The actual control of variable gain amplifier 118 takes place by virtue of AND gates 123a and 125, and OR gate 127. Flip-flop 166 partially enables AND 123a. Flip-flop 168 partially enables AND gate 125. The remaining enablement of AND gates 123a and 125 is made possible by inputs to each of these AND gates to selector switch 100a. AND gate 123a is connected to selector switch 100a such that it is partially enabled by selector switch 100a whenever front panel switch 100c is turned to the channel A position. AND gate 125, correspondingly, is partially enabled by front panel switch 100c whenever that switch is turned to the channel B position.

The outputs of AND gates 123a and 125 are fed to OR gate 127, the output of OR gate 127 being directed to input 118a of variable gain amplifier 118. When OR gate 127 has a positive output, variable amplifier 118 operates at its high gain position, enabling the reception of whichever of the secure channels is tuned in on the front panel switch 100c.

In order to enable the reception of a secure channel, that one of flip-flop 166 and 168 corresponding to that channel must be actuated. Additionally, it is required that one of AND gates 123a and 125 to which the output of the actuated flip-flop is directed also be fully enabled. The completion of enablement of AND gate 123a and 125 is determined by the setting of front panel switch 100c. Therefore, in order to view the channel A program, the command message must be such that it will, on processing by matrix 149, actuate that one of AND gates 155 whose output goes to the input of flip-flop 166 which causes the flip-flop to become actuated to assume a positive output. Assitionally, front panel switch 100a must be tuned to the A position, in order to complete the enablement of the AND gate 123a.

Note that, under these conditions, channel B cannot be received, since, when one changes the selector switch to the channel B position, the complete enablement of AND gate 123a is no longer possible. Conversely, channel B, if not authorized by the setting of flip-flop 168 can never be received by simply turning the channel selector to B, since this cannot result in the complete enablement of AND gate 125.

ALL CALL

In addition to the selective enablement of specific ones of the room units, it is often desirable to be able to actuate all of the room units in a particular group thereof. The preferred embodiment of this invention, further includes apparatus for addressing simultaneously all of such room units.

The apparatus in this invention can accomplish this purpose by the addition of another function to the sync recognition AND gate 150. AND gate 150 is provided with a second output extending to one input of AND gate 160. The other input to AND gate 160 is the output of AND gate 157a, whose function has above been described. The output of AND gate 160 is a second input of OR gate 164, whose function has also been described above.

The above structure has the effect of enabling the decoding and execution of the command portion of the message transmitted to any room unit whenever the last eight bits of the 20-bit address portion of the data signal are all logical one bits. The way this takes place is as follows:

The synchronization signal is received at shift register 120 in the fashion described above, and the register is cleared, except for cell 1. Then follows three bits constituting the command message, 12 bits which may be any combination of bits at all, followed by eight one bits. When this succession of bits marches through shift register 120 until the 1–0 condition of cells 24 and 25 enables address recognition, the logical bits are lined up in the first 23 cells of shift register 120 as follows:

Cells 1–8 each contain a one bit, cells 9–20 may contain any combination of bits whatsoever, and cells 21–23 contain the command bits.

It can be seen by inspection, that, when AND gate 157a is actuated by the presence of the 1–0 condition in cells 24 and 25, and there is a one bit in each of cells 1–8, AND gate 160 will be actuated to produce an output to OR gate 164a. This output to OR gate 164a enables the command recognition and execution exactly in the same fashion as if the address were recognized as set forth above by address recognition AND gate 162.

Apparatus can be provided for generation of these all call signals in an abbreviated manner. Such apparatus can be provided either at the downtown central or the hotel central locations. In FIG. 4, this apparatus comprises:

Control button panel 200, having one button corresponding to each command of the desired group of commands. For example, in a preferred embodiment the commands available are "A On", "A Off", "B On" and "B Off". When a command button on panel 200 is actuated, an output running from that button to an appropriate element of display panel 203 causes display panel 203 to illuminate a representation of the command which has been given on the all call command generator. Additionally, each all call command element in panel 200 has one output directed to matrix 202. Matrix 202 is constructed such that, for each single output received by matrix 202 in response to the actuation of a command button, the matrix generates a three bit binary signal corresponding to the command associated with the command element of panel 200 which is actuated.

Simultaneously outputs running from each of the elements of panel 200 actuate an all call address generator 204 to generate on twenty output lines the all call address, i.e., twelve binary logic bits arranged in any order whatsoever followed by eight one bits. This all call address signal is also applied to multiplexer 12, subsequent to the application of the command signal.

It can be seen that the all call generating apparatus could just as well have been connected to multiplexer 42 (FIG. 5), at the hotel central unit, rather than multiplexer 12 at the downtown central unit.

It is advantageous, in the conversion of signals for television reception, that the local oscillators which generate the signals which convert the secure channel signals to a signal directly receivable, that the local oscillator generate an output whose frequency is as precisely controlled as possible. If the local oscillator does not produce a signal having a precise frequency, it is necessary to provide that oscillator with apparatus for fine tuning, in order that the converted signal be within the range of reception of one of the conventional broadcast channels. Such a fine tuning provision can make tuning the converter and the television set a complicated procedure indeed. This double fine tuning, if not performed in the proper sequence could render the combined converter-receiver apparatus incapable of receiving the converted secure channel at all. It is conceivable that a hotel guest or other person unfamiliar with the theory of operation of such devices would be totally unable to fine tune the channel he desires.

In order to precisely control the frequency of each of local oscillators 112a and 112b, local oscillators A and B, respectively, crystal control of the oscillator frequencies is employed. As shown in FIG. 7, oscillator 112a includes transistor 211 having a tank circuit 212. The resonant frequency of the tank circuit is controlled by selected overtones of a predetermined frequency of crystal 213 which has piezoelectric properties. For example, the frequency of oscllator 112a can be 105 mHz. Transistor 214 amplifies the oscillator signal and the resulting output signal is applied to terminal 216 of line 217.

Oscillator 112b is substantially the same as oscillator 112a with the exception that it has a different frequency as determined by the overtones of crystal 218. By way of example, the frequency can be 116 mHz. Thus transistor 219 in conjunction with tank circuit 220 and crystal 218 present a frequency signal which is amplified by transistor 221 coupled to terminal 222 of line 217.

Either of oscillators 112a or 112b is enabled by a control signal coupled to the base of either transistor 211 or 219, the enabling signal being provided by front panel selector switch 100c.

Transistor 223 which is coupled to line 217 which is commonly connected to the oscillators serves as a frequency doubler and amplifier in conjunction with its associated circuitry. Accordingly, the output signal from transistor 223 on line 224 represents the doubled frequency of either of oscillators 112a or 112b. Thus for the examples recited above, the doubled frequencies would be 210 and 232 mHz for the respective oscillators.

Transistor 225 amplifies the frequency signal delivered by either of the oscillators since transistor 225 is commonly connected to the oscillator outputs. Therefore, the output of transistor 225 appearing on line 226 represents the amplified frequency of whichever oscillator has been employed. Therefore, in the examples the output is either 105 or 116 mHz.

In this way, oscillators 112a and 112b are controlled to oscillate with selected frequencies which are each very precisely fixed. This obviates the need for any form of fine turning on oscillators 112a or 112b and renders the converted signal at a precisely controlled frequency. The only fine tuning thus necessary is the conventional fine tuning employed on the television receiver itself.

As shown in FIG. 6, the output signal for frequency doubler 113 (transistor 223 and its related circuit in FIG. 7) is coupled to band pass filter 113a and thence to video mixer 164 for effecting the frequency conversion of the video signals of the receiver channels. The output signal of either of the oscillators 112a and 112b when amplified by amplifier 108a (transistor 225 and its related circuitry in FIG. 7) is coupled to data and barker mixer 108 in which there is effected heterodyning of the barker signal and the data signal to lower intermediate frequencies. In the examples recited above, the intermediate barker signal is 455 mHz while the intermediate data signal is 5.5 mHz.

What is claimed is:

1. A communication system for selectively enabling at least one predetermined subscriber of a plurality of subscribers to utilize information signals transmitted thereto by way of at least one secure channel of a transmission path, the selective enabling of the subscriber being in response to predetermined control signals transmitted over the transmission path which are distinct for each subscriber, comprising:
   a. at least one control system including:
      1. means for propagating the information signals on the secure channel of the transmission path;
      2. means for sending the predetermined control signals in the form of a binary coded decimal including a series of a binary logical bits by way of the transmission path, the predetermined control signals for each different predetermined subscriber including at least,
         i. a synchronizing signal portion made up of a first predetermined series of binary bits,
         ii. an address signal portion made up of a second predetermined series of binary bits which is different for each different predetermined subscriber, and
         iii. a command signal portion made up of a third predetermined series of binary bits for selectively enabling only the subscriber corresponding to the address signal to utilize the information signals, the command signal portion being different for each different secure channel; and
   b. a plurality of means each associated with a different predetermined subscriber for enabling a predetermined subscriber to utilize the information signals transmitted by way of the secured channel of the transmission path in response to the predetermined control signals transmitted over the transmission path which are distinct for the predetermined subscriber, the enabling means including:

1. a shift register for receiving and storing the series of logical bits from said means for sending;
2. coincidence means coupled to a selected position of said shift register and providing a first output signal responsive to a predetermined synchronizing signal portion being received in said selected position within said shift register;
3. means having an input coupled to said coincidence means and responsive to said first output signal for resetting all but selected stages of said shift register;
4. address recognizing means connected to said shift register, said address recognizing means having an enable input coupled to said coincidence means and responsive to said first output signal to provide a second output signal response to a predetermined address signal portion being received and stored in said shift register; and
5. command decoding means having an enabling input coupled to said address recognizing means responsive to said second output signal, said address recognizing means selectively responsive to a command signal portion being received and stored in said shift register; and
6. secured channel control means responsive to said command decoding means for enabling utilization of information on said secure channel corresponding to said command signal portion; and c. said means for enabling a predetermined subscriber to utilize the information signals transmitted by way of the secured channel includes a local oscillator for selectively converting said secured channel signal to a frequency receivable by said subscriber, said local oscillator having a tank circuit the resonant frequency of which controls the frequency output of said oscillator, said oscillator including: a resonant piezoelectric crystal connected in said tank circuit, said crystal being capable of resonance within a narrow frequency band to render said tank circuit resonant only within a narrow frequency band.

2. The improvement of claim 1, further comprising: means connected to the output of said local oscillator for producing a signal corresponding to that of said oscillator output the frequency of which is twice that of said output of said local oscillator.

3. The improvement of claim 1, further comprising:
a. said system including the transmission of said private channel information on a plurality of private channels having different frequencies, and
b. said oscillator including a plurality of said crystals, one corresponding to each private channel, the interposition of each of said crystals in said tank circuit rendering said local oscillator capable of producing an output appropriate for the conversion of its corresponding private channel information to said receivable frequency.

4. The improvement of claim 1, wherein: said local oscillator comprises a transistor oscillator.

5. Apparatus as in claim 1, wherein the enabling of a predetermined subscriber to utilize said information signals is initiated in accordance with a request for a secured channel by said predetermined subscriber over another transmission path independent of the transmission path for transmitting information signals, and further including means for actuating the control signal sending means in accordance with a request from the predetermined subscriber.

* * * * *

UNITED STATES PATENT AND TRADEMARK OFFICE
CERTIFICATE OF CORRECTION

PATENT NO. : 3,975,585
DATED : August 17, 1976
INVENTOR(S) : Donald Kirk Jr. and Michael J. Paolini It is certified that error appears in the above-identified patent and that said Letters Patent are hereby corrected as shown below:

Column 12, line 54, "4" should be --44--.

Column 13, line 54, "MHx" should be --MHz--.

Column 13, line 57, "12b" should be --112b--.

Column 14, line 26, "ouptut" should be --output--.

Column 14, line 44, "informtion" should be --information--.

Column 18, lines 2 and 3, "Assitionally" should be --Additionally--.

Column 19, line 51, "oscllator" should be --oscillator--.

Signed and Sealed this

First Day of March 1977

[SEAL]

Attest:

RUTH C. MASON
Attesting Officer

C. MARSHALL DANN
Commissioner of Patents and Trademarks